United States Patent
Kim et al.

(10) Patent No.: US 9,793,973 B2
(45) Date of Patent: Oct. 17, 2017

(54) NON-FEEDING RERADIATING REPEATER AND METHOD FOR MANUFACTURING OF THE SAME

(71) Applicant: Samsung Electronics Co., Ltd., Suwon-si (KR)

(72) Inventors: Hyun-Jin Kim, Seoul (KR); Byung-Chul Kim, Yongin-si (KR); Young-Ju Lee, Seoul (KR); Jung-Yub Lee, Yongin-si (KR); Dong-Kyu Choi, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 86 days.

(21) Appl. No.: 14/854,863

(22) Filed: Sep. 15, 2015

(65) Prior Publication Data

US 2016/0079679 A1    Mar. 17, 2016

(30) Foreign Application Priority Data

Sep. 15, 2014   (KR) .......................... 10-2014-0122153

(51) Int. Cl.
*H01Q 3/44*      (2006.01)
*H04B 7/145*     (2006.01)
*H01Q 15/14*     (2006.01)

(52) U.S. Cl.
CPC ............... *H04B 7/145* (2013.01); *H01Q 3/44* (2013.01); *H01Q 15/14* (2013.01)

(58) Field of Classification Search
CPC   H01Q 3/44; H01Q 3/46; H01Q 15/00; H01Q 15/0013; H01Q 15/14; H01Q 15/141; H01Q 15/142; H01Q 15/148; H01Q 21/0061; H01Q 21/065; H04B 7/145

See application file for complete search history.

(56) References Cited

U.S. PATENT DOCUMENTS

| | | | | |
|---|---|---|---|---|
| 4,684,952 | A  * | 8/1987 | Munson ............... | H01Q 21/065 342/368 |
| 5,583,507 | A  * | 12/1996 | D'Isepo ................ | G01S 13/756 342/45 |
| 7,719,463 | B2 * | 5/2010 | Migliaccio ............... | H01Q 3/46 342/188 |
| 8,217,847 | B2 * | 7/2012 | Sotelo ...................... | H01Q 3/46 343/700 MS |
| 8,412,130 | B2 | 4/2013 | Suematsu et al. | |
| 9,350,063 | B2 * | 5/2016 | Herbsommer ............ | H01P 3/16 |
| 2009/0298421 | A1 | 12/2009 | Andersson et al. | |
| 2010/0001918 | A1* | 1/2010 | Svensson ................. | H01Q 3/46 343/848 |

* cited by examiner

*Primary Examiner* — Tho G Phan
*Assistant Examiner* — Patrick Holecek
(74) *Attorney, Agent, or Firm* — McAndrews, Held & Malloy, Ltd.

(57) ABSTRACT

Disclosed are a non-feeding re-radiating repeater and a method for manufacturing the same. The repeater includes: a dielectric substrate having a flat plate shape or a curved shape; and one or more unit cells formed on the dielectric substrate, in which each of the unit cells includes an arrangement of a plurality of conductor patterns. When electromagnetic waves incident from a first direction, the unit cells may re-radiate the electromagnetic waves in a second direction which is different from the first direction.

15 Claims, 16 Drawing Sheets

NON-FEEDING RERADIATING REPEATER AND METHOD FOR MANUFACTURING OF THE SAME

CROSS-REFERENCE TO RELATED APPLICATION

This application claims the priority under 35 U.S.C. §119(a) to Korean Application Serial No. 10-2014-0122153, which was filed in the Korean Intellectual Property Office on Sep. 15, 2014, the entire content of which is hereby incorporated by reference.

TECHNICAL FIELD

Various embodiments of the present disclosure are related to a repeater, for example, a re-radiating repeater that radiates received electromagnetic waves to a different direction.

BACKGROUND

Recently, wireless communication technology has been implemented with various measures, such as Wireless Local Area Network (W-LAN) represented by the Wi-Fi technology, Bluetooth, and Near Field Communication (NFC), in addition to connection of commercial mobile communication networks. Mobile communication services began from the voice communication-oriented first generation mobile communication service and have gradually evolved to high-speed large-capacity services (e.g., a high quality video image streaming service). It is expected that a next generation mobile communication service to be commercially available in the future will be provided through a super-high frequency band of dozens or more of GHz.

As the communication standards, such as W-LAN or Bluetooth, are vitalized, electronic devices, for example, mobile communication terminals are equipped with antenna devices operated in various different frequency bands. For example, the fourth generation mobile communication services are operated in the frequency bands of, e.g., 700 MHz, 1.8 GHz, and 2.1 GHz, WiFi is operated in the frequency bands of 2.4 GHz and 5 GHz which may be somewhat different among rules and regulations, and Bluetooth is operated in the frequency band of 2.45 GHz.

In order to provide a stable service quality in a commercial wireless communication network, a high gain and a wide beam coverage of an antenna device should be satisfied. The next generation mobile communication service is a super-high frequency band of dozens or more of GHz (e.g., a frequency band in a range of about 30 GHz to 300 GHz and a length of a resonant frequency wavelength in a range of about 1 mm to 10 mm). Thus, an antenna device, which has a better performance in terms of operating frequency than that of the antenna devices used in the mobile communication services that have been commercially available before, may be requested.

In general, as the operating frequency band becomes wider or higher, the electromagnetic waves may exhibit a strong rectilinear propagating performance and may suffer from increased loss depending on a transmission distance. In addition, due to the strong rectilinear propagating performance of the electromagnetic wave, the attenuation or reflection loss of a signal power by an obstacle (e.g., a building, or a terrain feature) may increase. Accordingly, in a communication method using a high operating frequency, localized shadow regions may appear in built-up areas. Even inside the same building, electromagnetic wave environments may vary depending on divided spaces. Accordingly, in the communication method using a high operating frequency band, the electromagnetic wave environment may be improved by changing the direction of the electromagnetic waves such that the electromagnetic waves can be transmitted to the shadow regions. As measures for changing the direction of electromagnetic waves, a dual antenna system and a reflector structure have been proposed.

The dual antenna system arranges a reception antenna at a position where the electromagnetic wave environment is good, and arranges a transmission antenna connected to the reception antenna via a transmission line so that electromagnetic waves can be delivered to a shadow region. However, the performance may be degraded due to the loss in the transmission line. Although this may be complemented by arranging, e.g., an amplifier, the addition of, e.g., a power-feeding facility is requested. Thus, there is a difficulty in arranging the dual antenna system in a built-up area or an environment having a complicated internal structure.

The reflector structure merely reflects electromagnetic waves by properly arranging reflectors formed of a conductor, and may be considerably efficiently utilized in order to eliminate shadow regions. However, since the size of a metallic structure is large, there is a difficulty in forming a proper installation environment, such as an installation position, anywhere either indoors or outdoors.

SUMMARY

Accordingly, various embodiments of the present disclosure are to provide a non-feeding re-radiating repeater that may contribute to elimination of shadow regions of electromagnetic waves while being simple in structure and installation, and a method for manufacturing the same.

In addition, various embodiments of the present disclosure are to provide a non-feeding re-radiating repeater that is capable of delivering electromagnetic waves from a good electromagnetic wave environment to a poor electromagnetic wave environment without transmission loss, and a method for manufacturing the same.

In addition, various embodiments of the present disclosure are to provide a non-feeding re-radiating repeater that may be easily designed and installed so as to deliver electromagnetic waves in a proper direction according to an environment of a shadow region, and a method for manufacturing the same.

Thus, according to various embodiments of the present disclosure, a non-feeding re-radiating repeater may include: a dielectric substrate having a flat plate shape or a curved shape; and one or more unit cells formed on the dielectric substrate, in which each of the unit cells includes an arrangement of a plurality of conductor patterns. When electromagnetic waves incident from a first direction, the unit cells may re-radiate the electromagnetic waves in a second direction which is different from the first direction.

According to various embodiments of the present disclosure, there is provided a method of manufacturing a non-feeding re-radiating repeater. The method may include: setting the number and arrangement structure of unit cells to be arranged on a dielectric substrate, and an angle to re-radiate incident electromagnetic waves (hereinafter, "re-radiating angle"); calculating a phase difference between respective unit cells from an interval of the unit cells and a re-radiating angle of each unit cell; configuring the unit cells to be suitable for the re-radiating angle using a plurality of conductor patterns; and determining a size of the unit cells from the calculated phase difference between the respective unit cells.

According to various embodiments of the present disclosure, installed since no separate power-feeding facility is required, the non-feeding re-radiating repeater may be simply configured and installed. In addition, electromagnetic waves may be delivered from a region where the electromagnetic wave environment is good to a region where the electromagnetic wave environment is poor without transmission loss, so that the non-feeding re-radiating repeater can contribute to elimination of a shadow region of electromagnetic waves. In addition, it may be easy to adjust the direction of the re-radiated electromagnetic waves using, for example, the size and the arrangement of the conductor patterns that form the unit cells, and the size and the interval of the unit cells. Accordingly, it may be easy to design and arrange the unit cells to re-radiate the electromagnetic waves in a direction suitable for a shadow region according to an environment of the shadow region. Furthermore, since the non-feeding re-radiating repeater does not repeats the electromagnetic waves in a band out of a designed frequency in an already manufactured state, it is possible to prevent an interference phenomenon between the electromagnetic waves.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
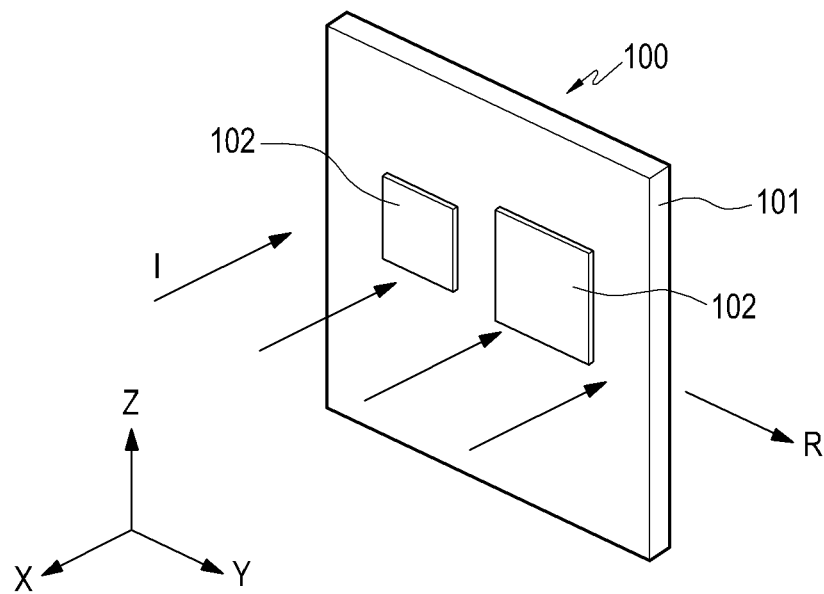
FIG. 1 is a view for describing an operation of a non-feeding re-radiating repeater according to various embodiments of the present disclosure.

The present disclosure may be variously changed and may have various embodiments, some of which will be described in detail with reference to the accompanying drawings. However, it should be understood that the present disclosure is not limited to the specific embodiments, but the present disclosure includes all modifications, equivalents, and alternatives within the spirit and the scope of the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

The terms used in this application is for the purpose of describing particular embodiments only and is not intended to limit the disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present disclosure, a non-feeding re-radiating repeater may include: a dielectric substrate having a flat plate shape or a curved shape; and one or more unit cells formed on the dielectric substrate, in which each of the unit cells includes an arrangement of a plurality of conductor patterns. When electromagnetic waves incident from a first direction, the unit cells may re-radiate the electromagnetic waves in a second direction which is different from the first direction.

In one embodiment, a delivery width, a direction, and a directivity of re-radiated electromagnetic waves may be set depending on the size, the interval, and the positions of the conductor patterns.

In another embodiment, the non-feeding re-radiating repeater may include a plurality of arrangements of the cells, and the delivery width and direction of the re-radiated electromagnetic waves may be set depending on an interval between the unit cells and the positions of the unit cells.

In still another embodiment, the dielectric substrate may be formed of a transparent material or a flexible material.

In the non-feeding re-radiating repeater as described above, the unit cells may re-radiate the electromagnetic waves incident on a first surface of the dielectric substrate, to a second surface of the dielectric substrate which is opposite to the first surface of the dielectric substrate.

In the non-feeding re-radiating repeater as described above, the dielectric substrate may be attached to any one of a window, an outer wall of a building, and an indoor wall surface.

According to various embodiments, the non-feeding re-radiating repeater may include a plurality of dielectric substrates, and an interval of the unit cells arranged on a first dielectric substrate among the plurality of dielectric substrates may be set to be different from intervals of the unit cells arranged on one or more other dielectric substrates.

According to various embodiments, each of the dielectric substrates may re-radiate electromagnetic waves thereon in an angular direction of 90 degrees, and the interval of the unit cells on each of the dielectric substrates may be set by the following Equation 1:

$$d = \frac{\lambda}{1 - \sin\alpha}, \quad (1)$$

where d is an interval of the unit cells arranged on each dielectric substrate, λ is a resonant frequency wavelength of the electromagnetic wave to be re-radiated, an α is an incident angle of the electromagnetic waves assuming that the incident angle of the electromagnetic waves perpendicularly incident on the dielectric substrate is zero (0) degrees.

According to various embodiments, the incident angle of the electromagnetic waves incident on each dielectric substrate may be set to be different from the incident angle of the electromagnetic waves incident on any other electric substrate.

According to various embodiments, the dielectric substrates may be laminated to each other.

Figure 2:
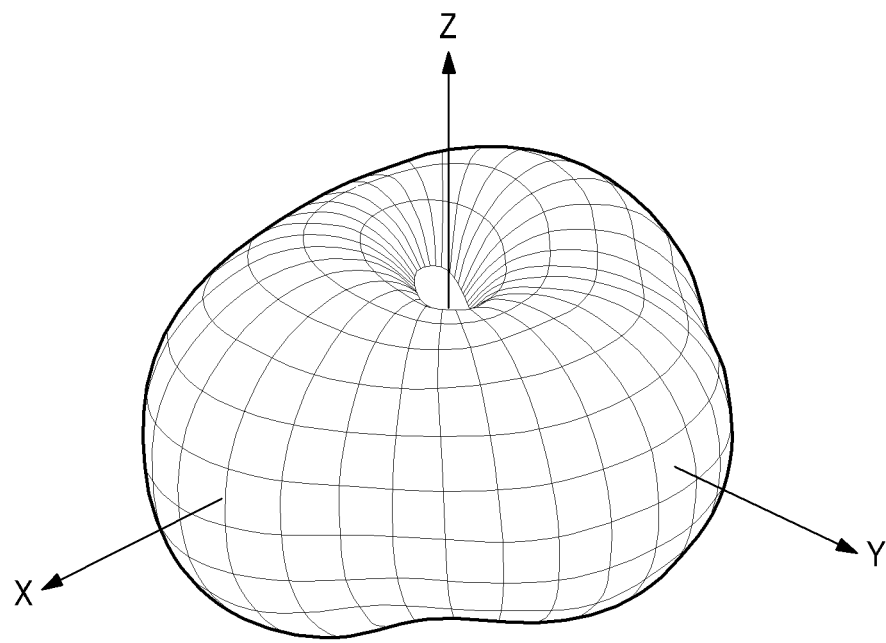
FIG. 2 is a view for describing an operation principle of the non-feeding re-radiating repeater according to the various embodiments of the present disclosure.

FIG. 1 is a view for describing an operation of a non-feeding re-radiating repeater according to various embodiments of the present disclosure. FIG. 2 is a view for describing an operation principle of the non-feeding re-radiating repeater according to the various embodiments of the present disclosure.

Referring to FIGS. 1 and 2, various embodiments of the present disclosure, a non-feeding re-radiating repeater 100 may include a dielectric substrate 101 and one or more unit cells 102 arranged on the dielectric substrate 101. As will be described below, the unit cells 102 may be formed of a plurality of conductor patterns. When one pair of unit cells 102 are arranged parallel to each other on the dielectric substrate 101, and plane waves are incident (I) on the non-feeding re-radiating repeater 100, electromagnetic waves reflected in the X-direction, and electromagnetic waves R re-radiated in the Y-direction may appear in similar levels, as illustrated in FIG. 2. According to various embodiments of the present disclosure, the non-feeding re-radiating repeater 100 may adjust, for example, the delivery wave, direction, and directivity of the re-radiating electromagnetic waves R while suppressing reflected electromagnetic waves through the configuration and arrangement of the unit cells 102 as described above without transmission loss even if no separate feeding is provided.

Figure 3:
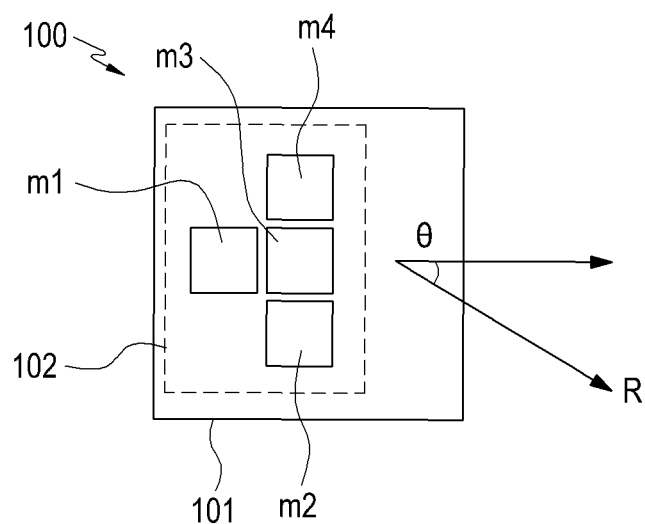
FIG. 3 is a view exemplifying conductor patterns that form unit cells of a non-feeding re-radiating repeater according to one of the various embodiments of the present disclosure.
Figure 4:
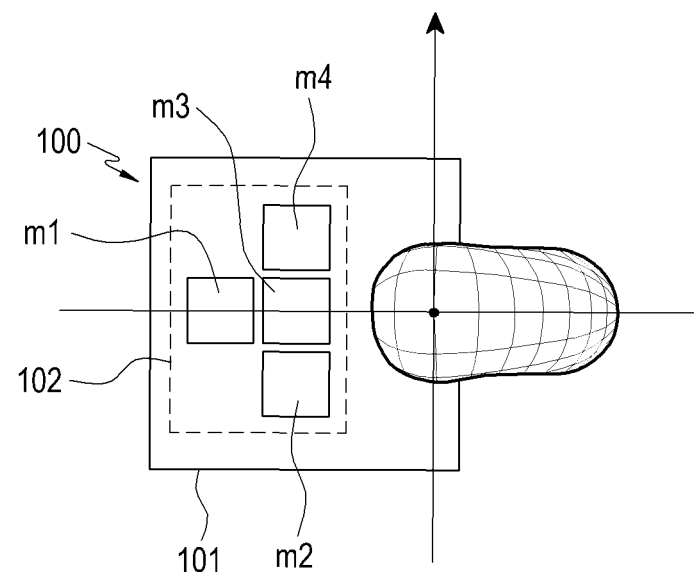
FIGS. 4 and 5 are views illustrating radiation characteristics according to the sizes and arrangements of the conductor patterns of the non-feeding re-radiating repeater according to one of the various embodiments of the present disclosure, respectively.
Figure 5:
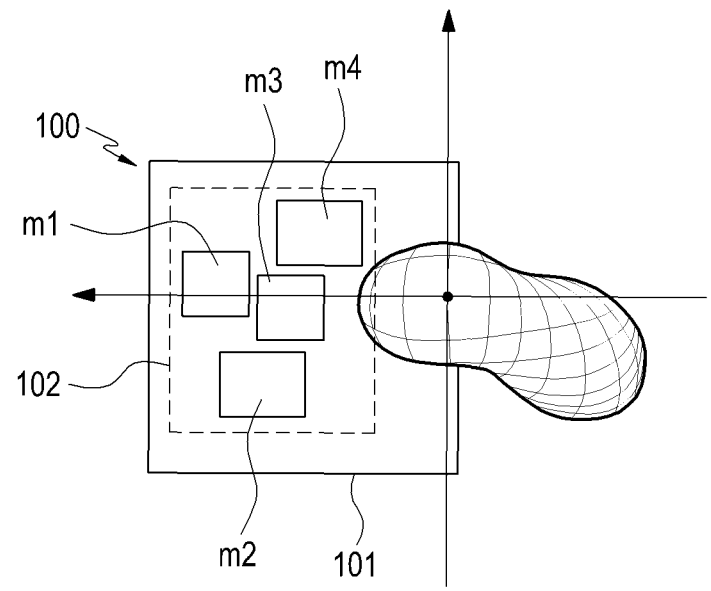

FIG. 3 is a view exemplifying conductor patterns that form unit cells of a non-feeding re-radiating repeater according to one of the various embodiments of the present disclosure. FIGS. 4 and 5 are views illustrating radiation characteristics according to the sizes and arrangements of the conductor patterns of the non-feeding re-radiating repeater according to one of the various embodiments of the present disclosure, respectively.

Referring to FIG. 3, the dielectric substrate 101 may be made transparently or flexibly using materials, such as FR4, polyamide, and Graphene. In addition, the dielectric substrate 101 may be formed in various shapes, such as a flat plate shape or a curved shape, depending on an environment where the non-feeding re-radiating repeater 100 is mounted. Conductor patterns m1, m2, m3, and m4 that form the unit cell 102 may be formed of a metallic material. When the dielectric substrate 101 is formed of a transparent material, the conductor patterns m1, m2, m3, and m4 may also be formed of a transparent conductor, such as an Indium-Tin Oxide (ITO).

While FIG. 3 exemplifies each of the conductor patterns m1, m2, m3, and m4 as a square shape, the conductor patterns may be made in proper shapes depending on, for example, a frequency band of the electromagnetic waves delivered by the non-feeding re-radiating repeater 100, and a direction desired to deliver the electromagnetic waves. For example, each of the conductor patterns m1, m2, m3, and m4 may be formed in a polygonal shape, such as a triangular shape or a rectangular shape, or a rod shape. In addition, the arrangement of the conductor patterns m1, m2, m3, and m4 illustrated in FIG. 3 may also be properly changed in consideration of the frequency band or the delivery direction. For example, the sizes and arrangement interval of the conductor patterns m1, m2, m3, and m4 illustrated in FIG. 3 may be adjusted so as to change the delivery direction of the electromagnetic waves.

More specifically, for example, the radiating direction θ of the electromagnetic waves R re-radiated by the unit cell 102 formed by the arrangement of the conductor pattern m1, m2, m3, and m4 as illustrated in FIG. 3 (hereinafter, referred to as "radiating direction") may be formed as an angle of zero (0) degrees, as illustrated in FIG. 4. When the sizes and arrangement of the conductor patterns m1, m2, m3, and m4 are changed as illustrated in FIG. 5, the radiating direction θ may be changed to an angular direction of about 20 degrees. In addition, although not illustrated, when the interval between the conductor patterns designated by m2 and m3 in FIG. 3 is increased and the conductor pattern m1 is moved downward, the radiating direction θ re-radiated by the unit cell may be changed toward the right upper side. In addition, the directivity may increase generally in proportion to the size of the conductor pattern designated by m1.

Figure 6:
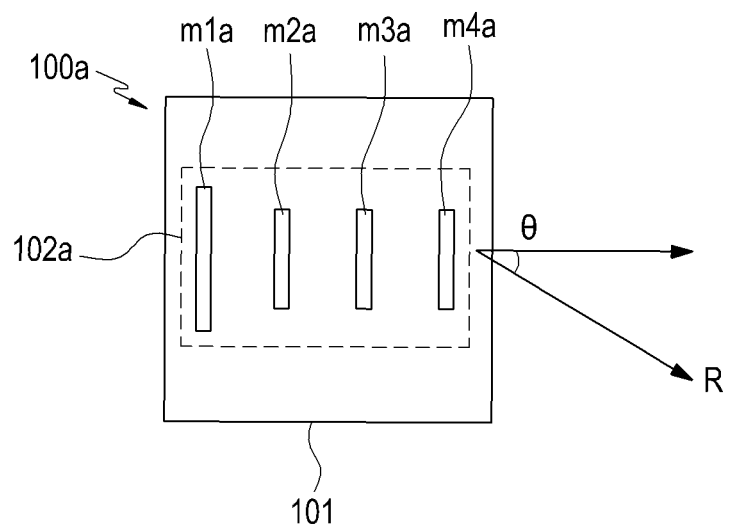
FIG. 6 is a view exemplifying conductor patterns that form unit cells of a non-feeding re-radiating repeater according to another one of the various embodiments of the present disclosure.
Figure 7:
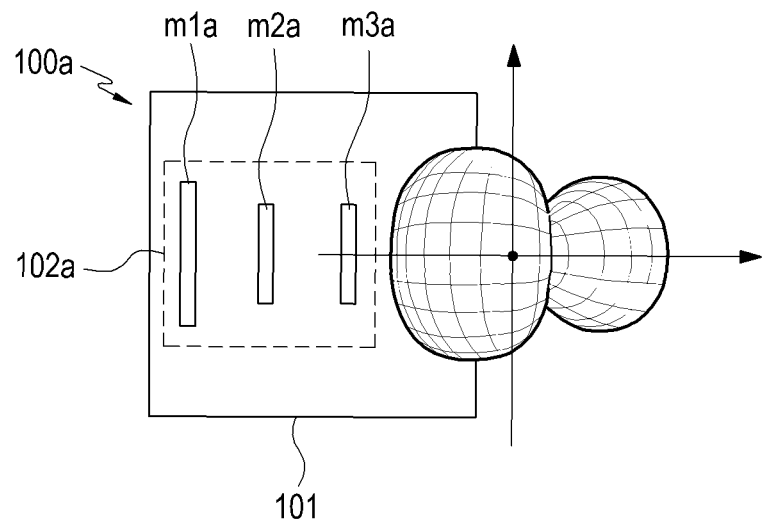
FIGS. 7 and 8 are views illustrating radiation characteristics according to the shapes and arrangements of the conductor patterns of the non-feeding re-radiating repeater according to another one of the various embodiments of the present disclosure, respectively.
Figure 8:
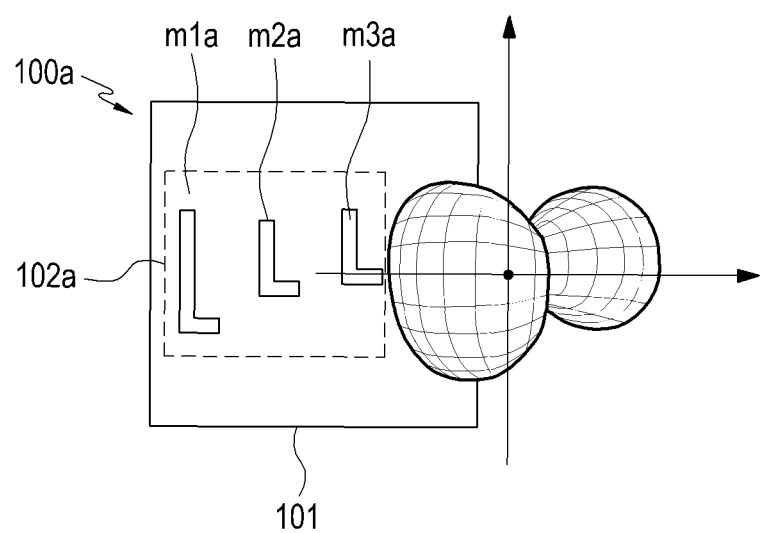

FIG. 6 is a view exemplifying conductor patterns that form unit cells of a non-feeding re-radiating repeater according to another one of the various embodiments of the present disclosure. FIGS. 7 and 8 are views illustrating radiation characteristics according to the shapes and arrangements of the conductor patterns of the non-feeding re-radiating repeater according to another one of the various embodiments of the present disclosure, respectively.

Referring to FIG. 6, the dielectric substrate 101 of the non-feeding re-radiating repeater 100*a* may be manufactured transparently or flexibly using a material, such as FR4, or polyamide. In addition, the dielectric substrate 101 may be manufactured in various shapes, such as a flat plate shape or a curved shape, according to an environment where the non-feeding re-radiating repeater 100*a* is mounted. The conductor pattern m1*a*, m2*a*, m3*a*, and m4*a* forming the unit cell 102*a* of the non-feeding re-radiating repeater 100*a* may be formed of a metallic material. When the dielectric substrate 101 is formed of a transparent material, the conductor patterns m1*a*, m2*a*, m3*a*, and m4*a* may also be formed of a transparent conductor such as Indium-Tin Oxide (ITO).

While FIG. 6 exemplifies each of the conductor patterns m1*a*, m2*a*, m3*a*, and m4*a* as a rod shape, the sizes and arrangement interval of the conductor patterns m1*a*, m2*a*, m3*a*, and m4*a* may be variously set depending on the frequency band of the electromagnetic waves delivered by the non-feeding re-radiating repeater 100*a* or a direction desired to deliver the electromagnetic waves. For example, the radiating direction θ of the unit cell 102*a* formed by the arrangement of the conductor patterns m1*a*, m2*a*, m3*a*, and m4*a* illustrated in FIG. 6 may be formed as an angle of zero (0) degrees, as illustrated in FIG. 7. When the sizes, shapes and arrangement of the conductor pattern m1*a*, m2*a*, m3*a*, and m4*a* are changed as illustrated in FIG. 8, the radiating direction θ may be changed to an angular direction of about −10 degrees.

Figure 9:
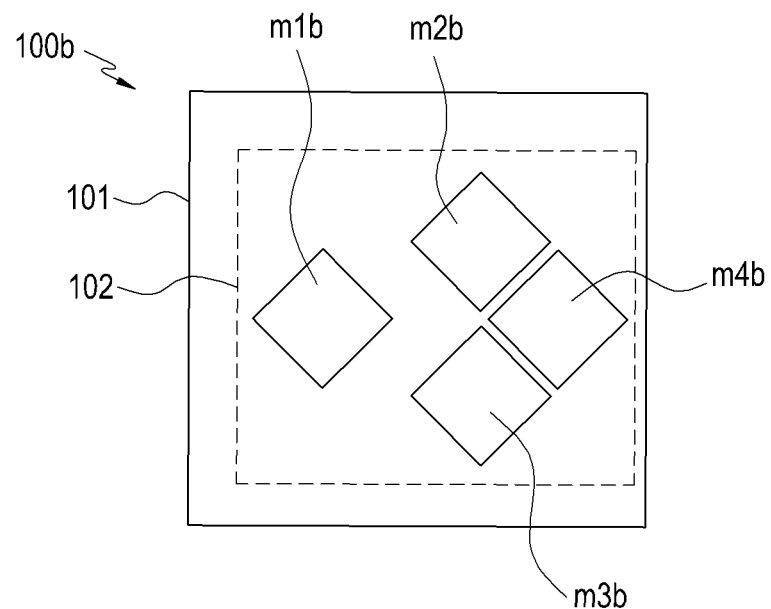
FIGS. 9 and 10 are views illustrating variations of the unit cells of the non-feeding re-radiating repeater according to the various embodiments of the present disclosure, respectively.
Figure 10:
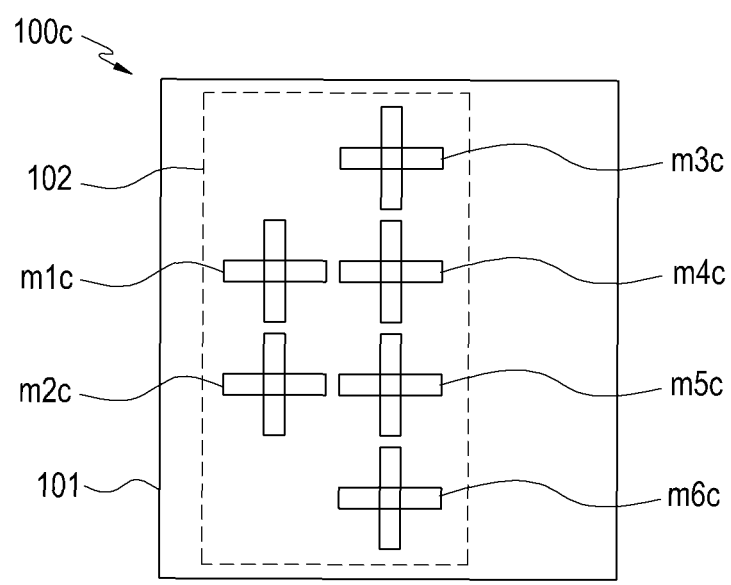

FIGS. 9 and 10 are views illustrating variations of the unit cells of the non-feeding re-radiating repeater according to the various embodiments of the present disclosure, respectively.

As illustrated in FIGS. 9 and 10, the conductor patterns m1*b*, m2*b*, m3*b*, m4*b*, m1*c*, m2*c*, m3*c*, m4*c*, m5*c*, and m6*c* that form the unit cell 102 may be formed in various shapes, such as a diamond shape and a cross shape. In addition, while the preceding embodiment exemplifies one unit cell 102 having a configuration in which four conductor patterns form a predetermined arrangement, the number and arrangement of the conductor patterns may be variously changed as illustrated in FIGS. 9 and 10. The configurations of the unit cells 102 and 102*a*, for example, the number and arrangement of the conductor patterns may be properly set in consideration of the direction desired to deliver the electromagnetic waves.

Figure 11:
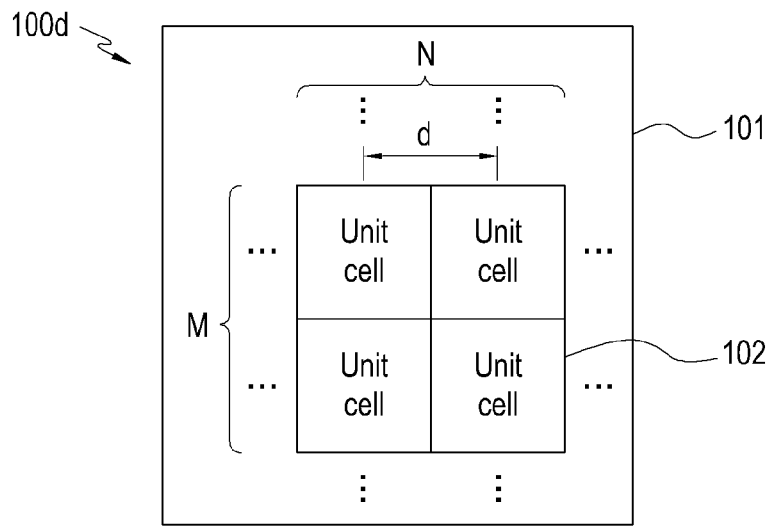
FIG. 11 is a view exemplifying an arrangement of unit cells of the non-feeding re-radiating repeater according to various embodiments of the present disclosure.

FIG. 11 is a view exemplifying an arrangement of unit cells of the non-feeding re-radiating repeater according to various embodiments of the present disclosure.

Referring to FIG. 11, as the number of unit cells 102 (M*N) arranged on the dielectric substrate 101 increase, the power of the delivered (re-radiated) electromagnetic waves may increase. In addition, by adjusting the sizes and interval d of the unit cells 102, the radiating direction θ may be adjusted. Such designing and manufacturing methods will be described in more detail, for example, FIG. 12.

According to various embodiments of the present disclosure, a method for manufacturing a non-feeding re-radiating repeater may include: setting the number and arrangement structure of unit cells arranged on the dielectric substrate, and an angle to re-radiate the incident electromagnetic waves (hereinafter, referred to as a "re-radiating angle"); calculating a phase difference between respective unit cells from the interval between the unit cells and the re-radiating angle; configuring the unit cells using a plurality of conductor patterns to be suitable for the re-radiating angle; and determining the sizes of the unit cells from the calculated phase difference between the respective unit cells.

In one embodiment, the phase difference between the respective unit cells may be calculated by Equation 2 as follows.

$$\psi = \beta \times d \times \cos\theta, \tag{2}$$

where ψ is a phase difference, β is a phase constant, d is a distance between the centers of each two adjacent unit cells, and θ is a re-radiating angle.

In another embodiment, a relationship between the phase difference between the respective unit cells and the size of the unit cells may be set in advance through a simulation.

In still another embodiment, the dielectric substrate may be formed of a transparent material or a flexible material.

Figure 12:
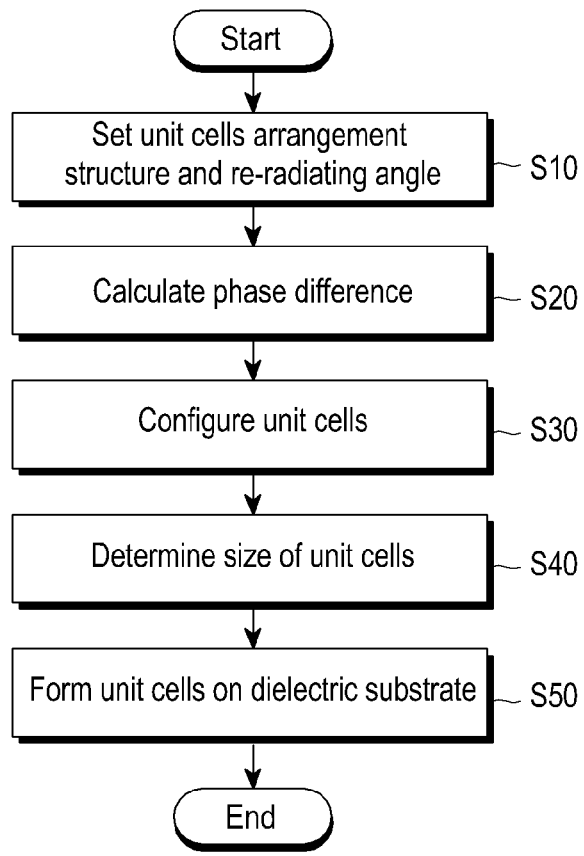
FIG. 12 is a flowchart illustrating a method for manufacturing a non-feeding re-radiating repeater according to various embodiments of the present disclosure.
Figure 13:
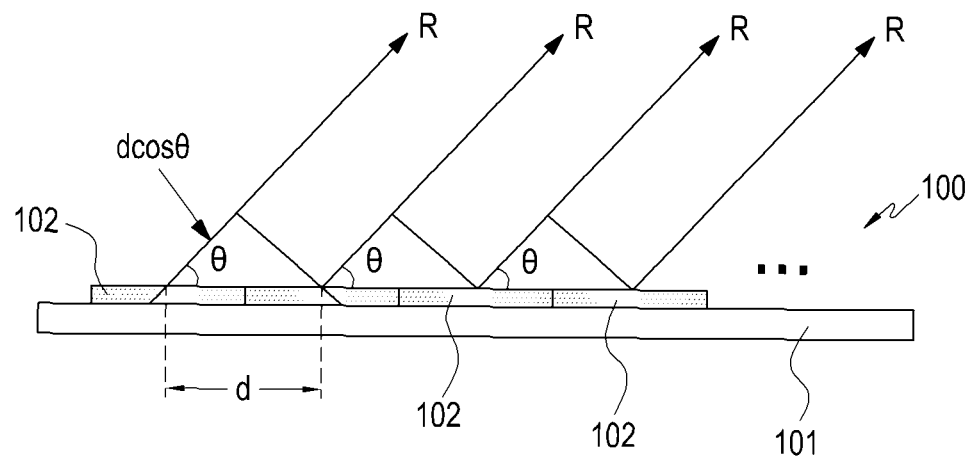
FIGS. 13 to 15 are views for describing the manufacturing method of the non-feeding re-radiating repeater according to the various embodiments of the present disclosure.
Figure 14:
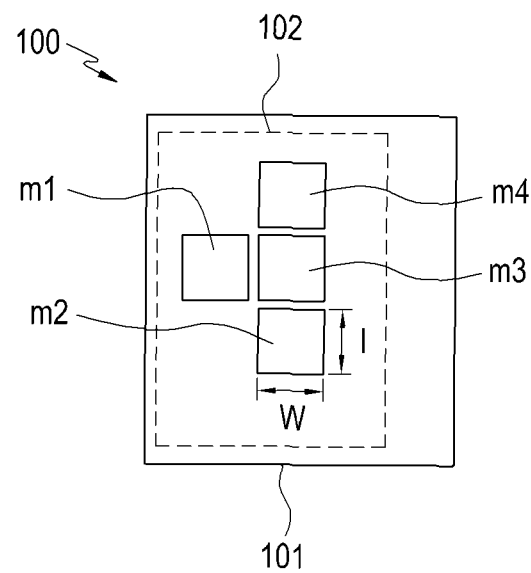
Figure 15:
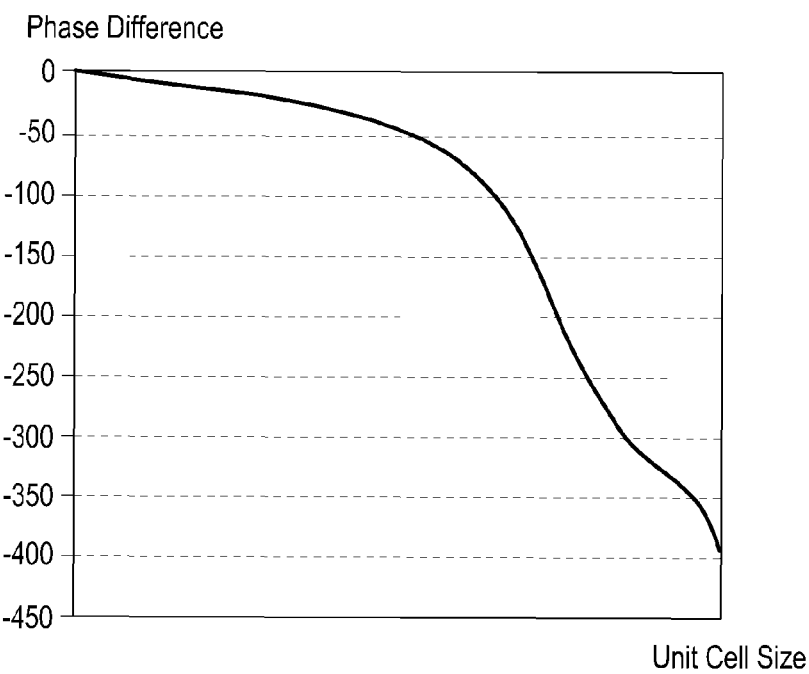

FIG. 12 is a flowchart illustrating a method for manufacturing a non-feeding re-radiating repeater according to various embodiments of the present disclosure. FIGS. 13 to 15 are views for describing the manufacturing method of the non-feeding re-radiating repeater according to the various embodiments of the present disclosure.

Referring to FIG. 12, according to various embodiments of the present disclosure, a method for manufacturing a non-feeding re-radiating repeater 100 (e.g., of FIG. 1) may comprise step of setting a standard of a manufacturing target non-feeding re-radiating repeater 100, for example, the number, an arrangement structure, and a radiating direction θ of unit cells 102 (e.g., of FIG. 1) (S10) (hereinafter, a "standard setting step"), a step of calculating a phase difference between respective unit cells 102 (S20) (hereinafter, a "first calculation step"), a step of configuring unit cells 102 using conductor patterns m1, m2, m3, and m4 to have a directivity in the set radiating direction θ (S30) (hereinafter, a "configuring step"), and a step of setting the size of the unit cells 102 from the calculated phase differences (S40) (hereinafter, a "second calculation step"). The above-described steps may be substantially deemed as a procedure of designing the manufacturing non-feeding re-radiating repeater 100, and the unit cells 102 may be formed on the dielectric substrate 101 according to the structure designed through the procedure so that the non-feeding re-radiating repeater 100 can be completed (S50) (hereinafter, a "completion step").

The standard setting step (S10) is a step in which, for example, the number, the arrangement structure (e.g., M*N), and the radiating direction θ of the unit cells 102 are determined in consideration of an environment where the non-feeding re-radiating repeater 100 is to be placed. Here, the "environment where the non-feeding re-radiating repeater is to be placed" may mean, for example, whether it is an indoor environment or an outdoor environment, how a space is divided when it is an indoor environment, and how surrounding buildings or terrain features are arranged when it is an outdoor environment. In consideration of the environment, the size and the arrangement structure of the unit cells 102 arranged on the dielectric substrate 101, the radiating direction θ, and the size and the arrangement of the conductor patterns m1, m2, m3, and m4 that form the unit cells 102 may be determined such that the electromagnetic waves can be delivered from a region where the electromagnetic wave environment is good to a shadow region.

The first calculation step (S20) is a step in which the phase difference between the unit cells 102 is calculated. Further referring to FIG. 13, the phase difference between the unit cells 102 may be calculated from the interval between the unit cells 102 and the radiating direction θ of the re-radiated electromagnetic waves R which have been determined in the standard setting step S10 using the following Equation 3.

$$\psi = \beta \times d \times \cos\theta, \quad (3)$$

where ψ is a phase difference, β is a phase constant, d is a distance between the centers of each two adjacent unit cells, and θ is a re-radiating angle.

The configuration step (S30) is a step of configuring respective unit cells 102 by forming the conductor patterns m1, m2, m3, and m4 on the dielectric substrate 101 such that the conductor patterns m1, m2, m3, and m4 of each of the cells 102 may be set to have the maximum directivity in the radiating direction θ determined in the standard setting step (S10). For example, as illustrated in FIG. 14, each of the unit cells 102 may have the maximum directivity in the radiating direction determined in the standard setting step S10 by designing the shape (e.g., a polygonal shape, a rod shape, or a cross shape) and the size (e.g., a length w and a width l), the number, the arrangement form, and the interval of the conductor patterns m1, m2, m3, and m4.

The second calculation step (S40) is a step in which the designed size of the unit cells 102 is set, in which the size may be determined from the phase difference between the respective unit cells 102. The relationship between the size and the phase difference of the unit cells 102 formed on the dielectric substrate 101 may be defined by an equation. However, as illustrated in FIG. 15, the relationship may be expressed in the form of a somewhat irregular graph (or tabled data) which is not defined by the equation. Unless the relationship between the size of the unit cells 102 and the phase difference is not defined by the equation, the relationship as illustrated by a graph in FIG. 15 may be obtained through a simulation. The simulation may determine the size of the unit cells 102 that satisfies the phase difference obtained in the first calculation step S20 while changing the size of the unit cells 102 in the state where maintaining the standard and the arrangement of the conductor patterns m1, m2, m3, and m4 of the unit cells 102 which have been determined through the standard setting step (S10) and the configuration step (S30).

In the completion step (S50), the unit cells 102 designed through the above-described procedure may be formed on the dielectric substrate 101 having a thickness of about 0.2 mm through the processes, such as vapor deposition and etching so that the non-feeding re-radiating repeater 100 can be completed.

Figure 16:
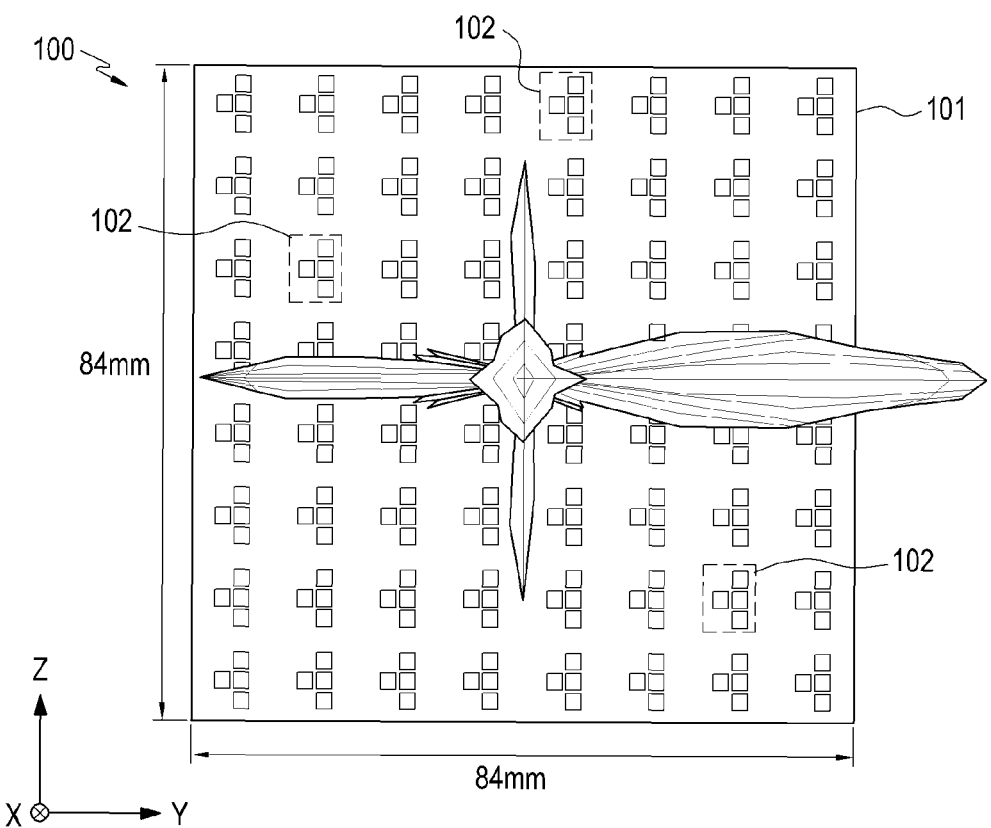
FIG. 16 is a view illustrating a radiation characteristic of a non-feeding re-radiating repeater according to one of the various embodiments of the present disclosure.
Figure 17:
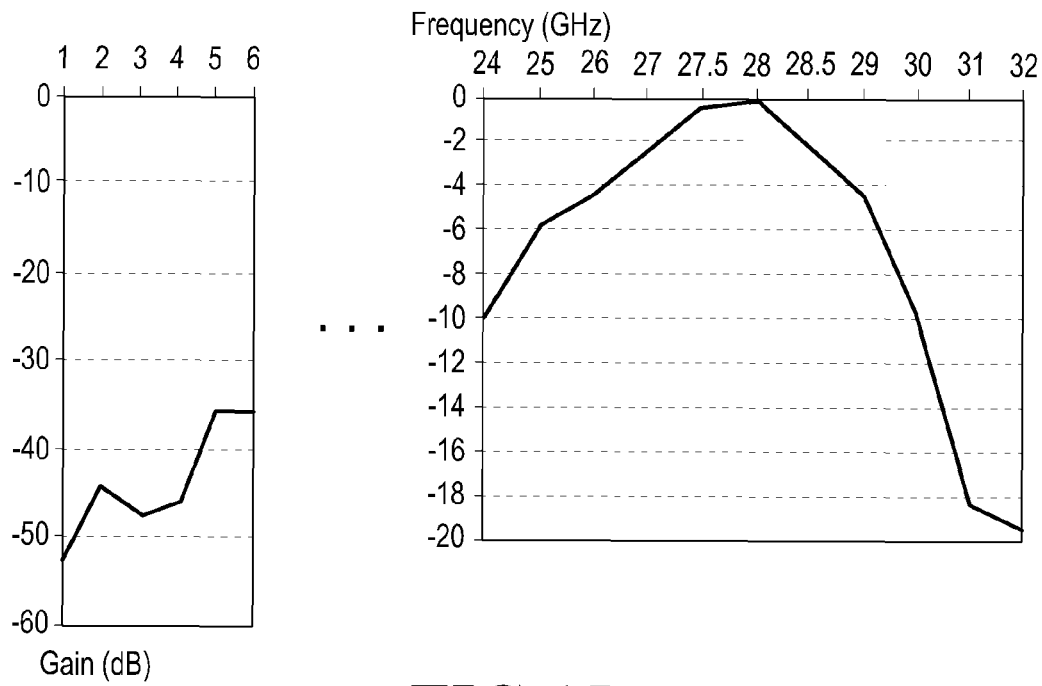
FIG. 17 is a graph for describing a radiation characteristic of the non-feeding re-radiating repeater according to one of the various embodiments of the present disclosure.

FIG. 16 is a view illustrating a radiation characteristic of a non-feeding re-radiating repeater according to one of the various embodiments of the present disclosure. FIG. 17 is a graph for describing a radiation characteristic of the non-feeding re-radiating repeater according to one of the various embodiments of the present disclosure.

Referring to FIG. 16, the non-feeding re-radiating repeater 100 manufactured through the steps as described above may be completed by forming the unit cells 102 in the 8*8 arrangement on the dielectric substrate 101 having a size of 84 mm*84 mm. FIG. 16 illustrates a radiation characteristic of re-radiated electromagnetic waves appearing when plane waves of 28 GHz are incident on the non-feeding re-radiating repeater 100 in the X-direction. At this time, the interval between the unit cells 102 is set by the length of the resonant frequency wavelength of the incident electromagnetic waves.

FIG. 17 represents a performance of electromagnetic waves re-radiated in the radiating direction of 90 degrees which was analyzed according to a frequency band of incident electromagnetic waves. In view of the measurement results, it can be seen that the electromagnetic waves re-radiated through the non-feeding re-radiating repeater 100 is capable of securing a band width of 1 GHz or more at 28 GHz and the electromagnetic waves of other frequency bands are attenuated. For example, it can be seen that the non-feeding re-radiating repeater 100 is capable of preventing an interference phenomenon of the electromagnetic waves of the existing commercial communication frequency bands (e.g., 800 MHz, 1.8 GHz, and 2.1 GHz).

Figure 18:
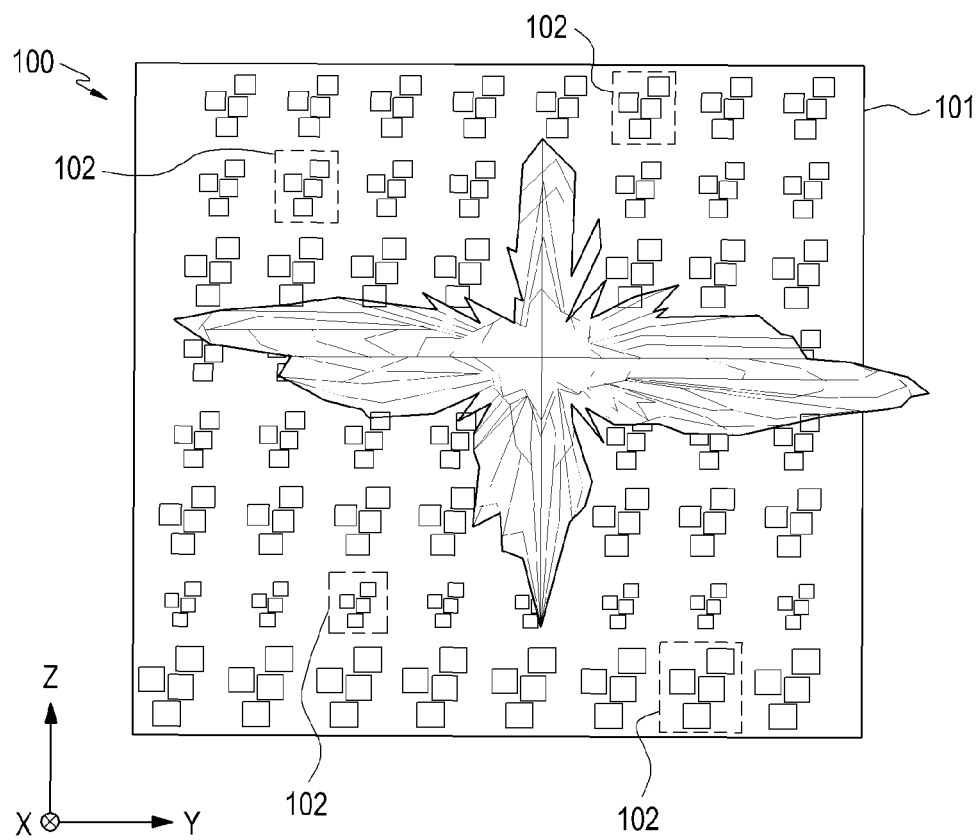
FIG. 18 is a view illustrating a radiation characteristic of a non-feeding re-radiating repeater according to another one of the various embodiments of the present disclosure.
Figure 19:
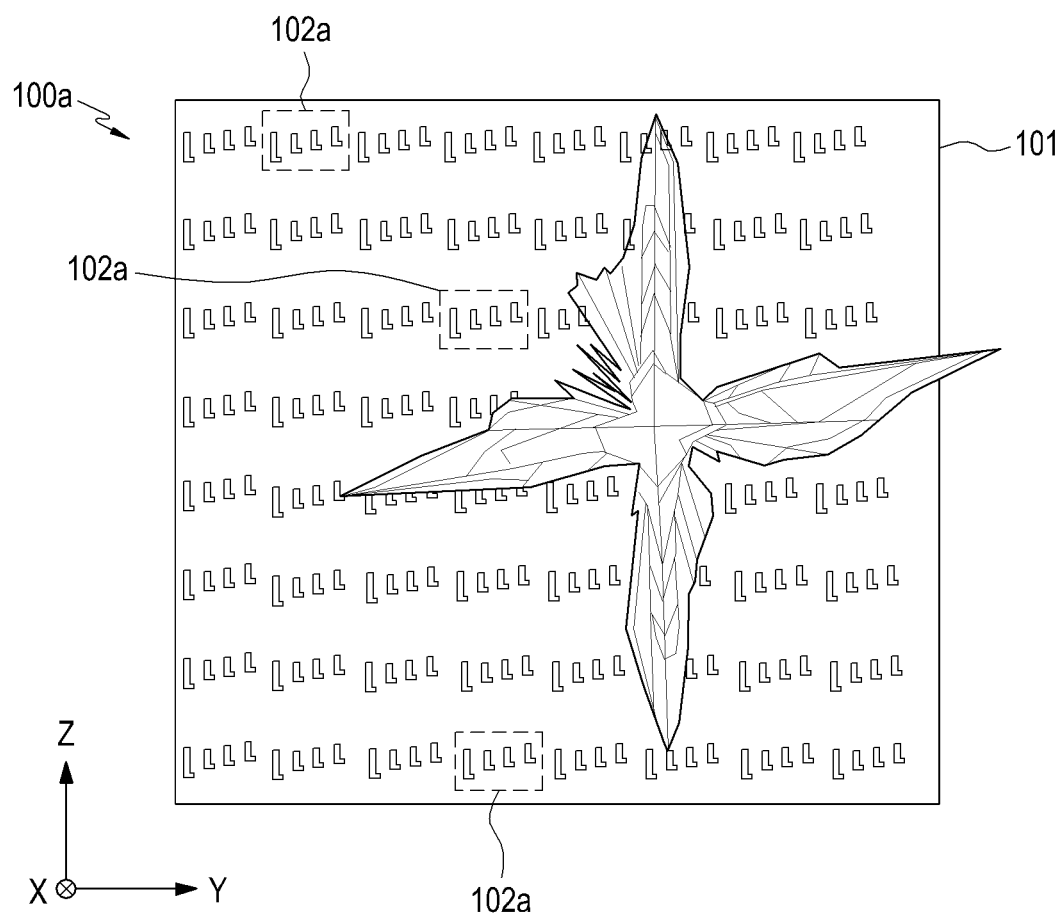
FIG. 19 is a view illustrating a radiation characteristic of a non-feeding re-radiating repeater according to still another one of the various embodiments of the present disclosure.

FIG. 18 is a view illustrating a radiation characteristic of a non-feeding re-radiating repeater according to another one of the various embodiments of the present disclosure. FIG. 19 is a view illustrating a radiation characteristic of a non-feeding re-radiating repeater according to still another one of the various embodiments of the present disclosure.

Referring to FIGS. 18 and 19, it can be seen that when the unit cells 102 and 102a are similarly arranged on the dielectric substrates 101 illustrated in FIG. 16 and having the same sizes, for example, the radiating directions of the re-radiated electromagnetic waves become different from each other depending on, for example, the shape, the size, and the arrangement structure of the conductor patterns that form the unit cells 102, and 102a. Similarly, for example, the delivery width and the direction of the re-radiated electromagnetic waves may be adjusted according to the arrangements (e.g., the size, the position, and the interval) of the unit cells 102 and 102a.

FIGS. 20 to 23 are views for describing use examples of a non-feeding re-radiating repeater according to the various embodiments of the present disclosure.

Figure 20:
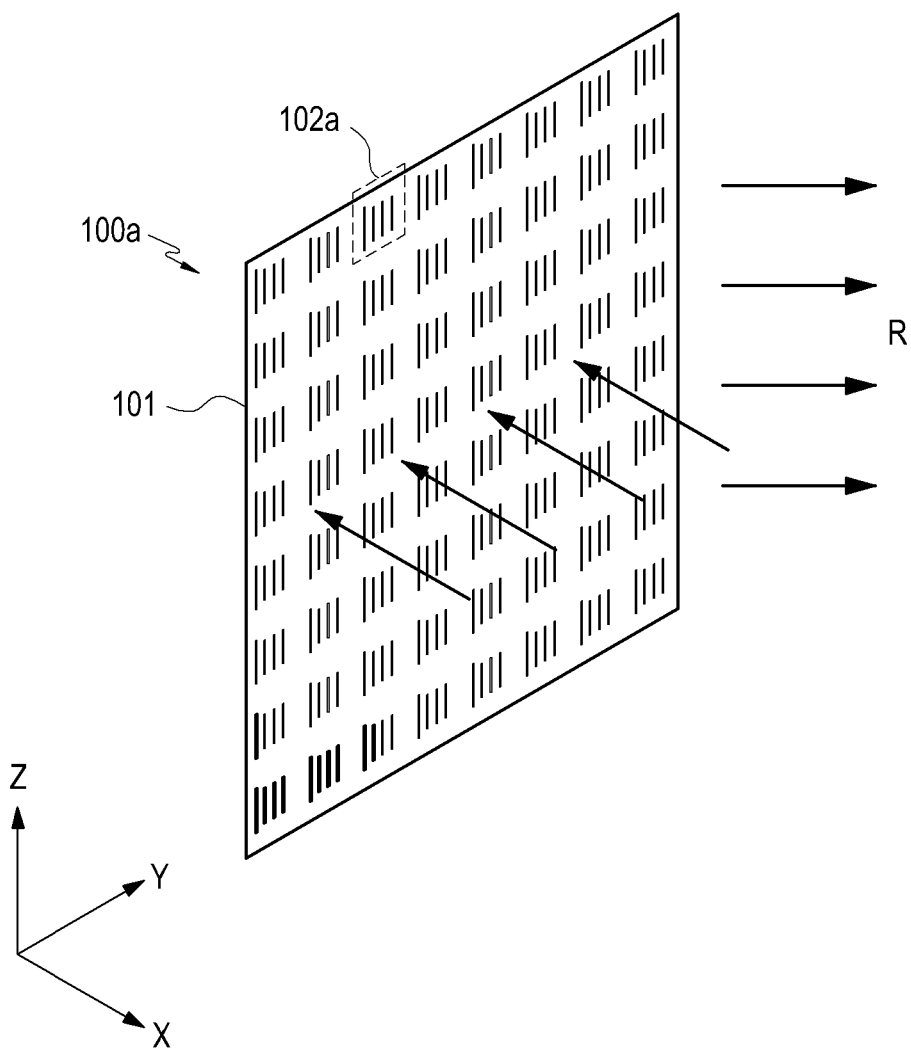
FIGS. 20 to 23 are views for describing use examples of a non-feeding re-radiating repeater according to the various embodiments of the present disclosure.

Referring to FIG. 20, the electromagnetic waves R re-radiated by the non-feeding re-radiating repeater 100a may be radiated in a direction close to the direction of about 90 degrees with respect to the incident plane waves I. The above-described non-feeding re-radiating repeater 100a may be usefully utilized in the case where the electromagnetic wave environment is good at one side of hallways or roads that intersect perpendicularly (or slantly) in relation to each other and a shadow region is formed at the other side. For example, when the non-feeding re-radiating repeater 100a is placed on an indoor wall surface (or an outer wall of a building) to face a direction where the electromagnetic wave is good (e.g., in the X-direction), the electromagnetic waves I incident on the non-feeding re-radiating repeater 100a may be delivered (re-radiated) to the shadow region (e.g., in the Y-direction) by the non-feeding re-radiating repeater 100a. At this time, the number, size, the shape, the arrangement of the conductor patterns that form the unit cells 102a or the number, the size and the arrangement intervals of the unit cells 102a arranged on the dielectric substrate 101 may be properly set in consideration of the width or the length of the shadow region, for example. These may be sufficiently considered when the determination is made in the standard setting step (S10).

Figure 21:
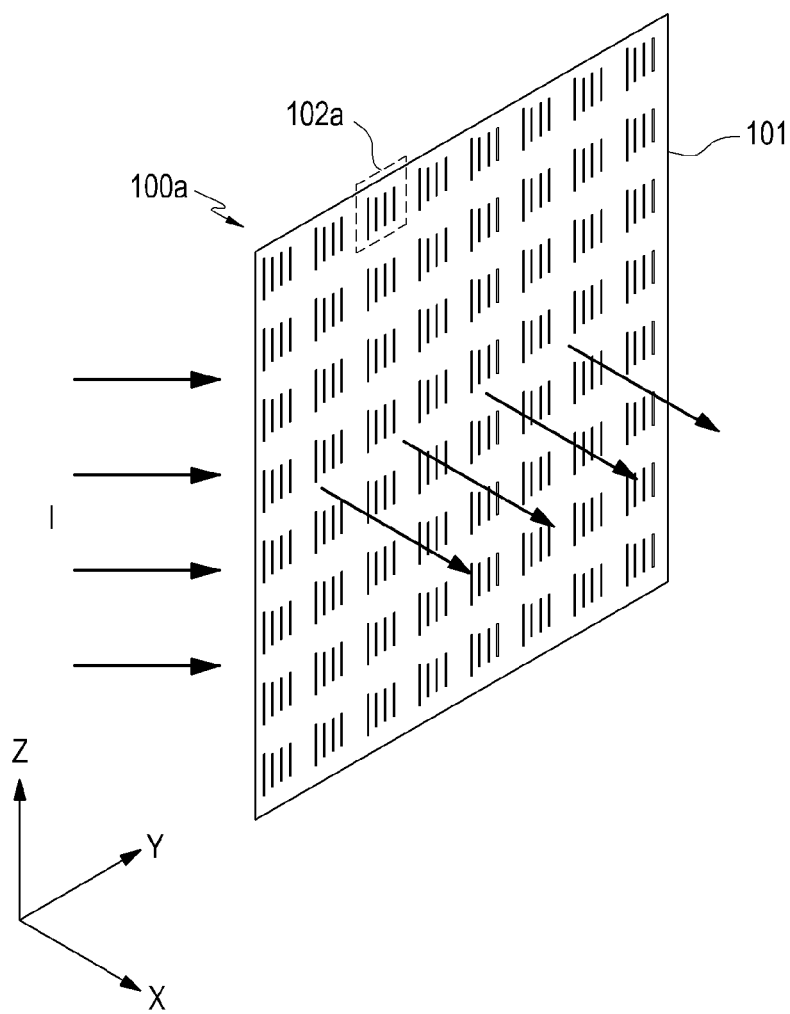
Figure 22:
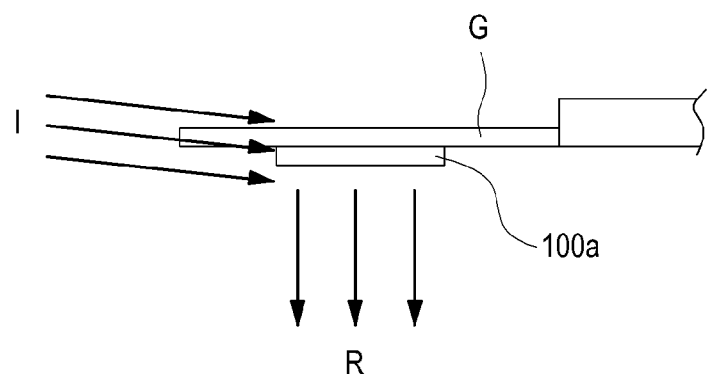

The non-feeding re-radiating repeater 100a may deliver or re-radiate the electromagnetic waves I, which slantly enter into one surface or the other surface thereof, from the other surface. When both the entry and the re-radiation are performed on one surface of the non-feeding re-radiating repeater 100a, the non-feeding re-radiating repeater 100a may be installed in, for example, intersecting indoor hallways or outdoer roads, similarly to the preceding embodiment. As illustrated in FIGS. 21 and 22, when the electromagnetic waves enter into one surface of the non-feeding re-radiating repeater 100a and are re-radiated from the other surface, the non-feeding re-radiating repeater 100a may be usefully utilized for delivering the electromagnetic waves from the outdoors to the indoors (e.g., the inside of a building or a vehicle). For example, when both the dielectric substrate 101 of the non-feeding re-radiating repeater 100a and the conductor patterns that form the unit cells 102a are made of a transparent material, the non-feeding re-radiating repeater 100a may be attached to a window of a building or a vehicle so as to eliminate a shadow region formed indoors.

Figure 23:
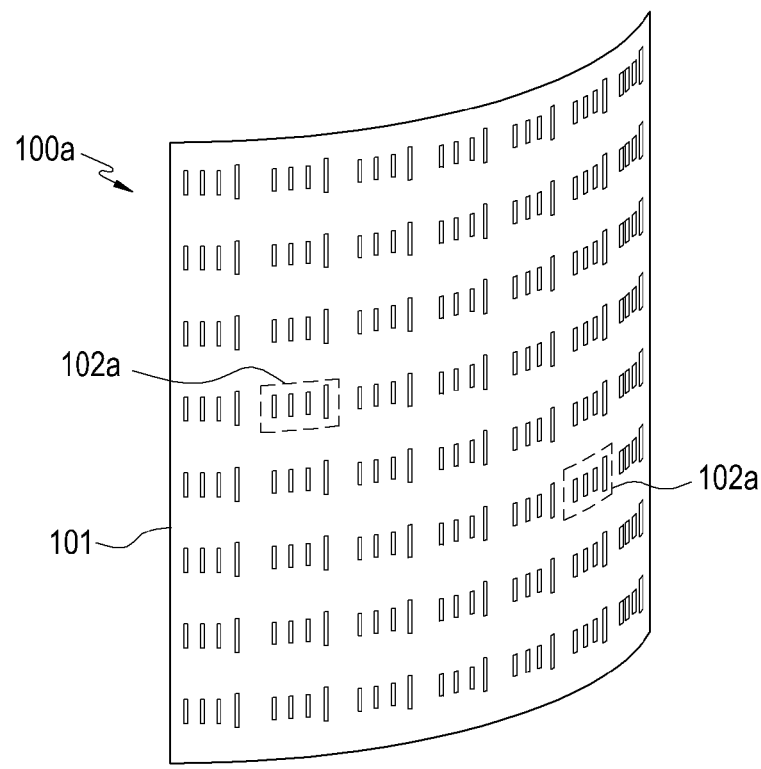

Referring to FIG. 23, when the dielectric substrate 101 is formed in a curved shape, or made of a flexible material, the non-feeding re-radiating repeater 100a may be mounted on a curved column, for example. When non-feeding-radiating repeaters are manufactured with the same standard are mounted in the curved shape as illustrated in FIG. 23, a wider beam coverage may be secured depending on the curvature thereof. For example, when a flat plate-shaped non-feeding re-radiating repeater has a coverage in an angular range of 10 degrees, a non-feeding re-radiating repeater mounted in the curved shape with the same standard may have a coverage in an angular range larger than 10 degrees.

Figure 24:
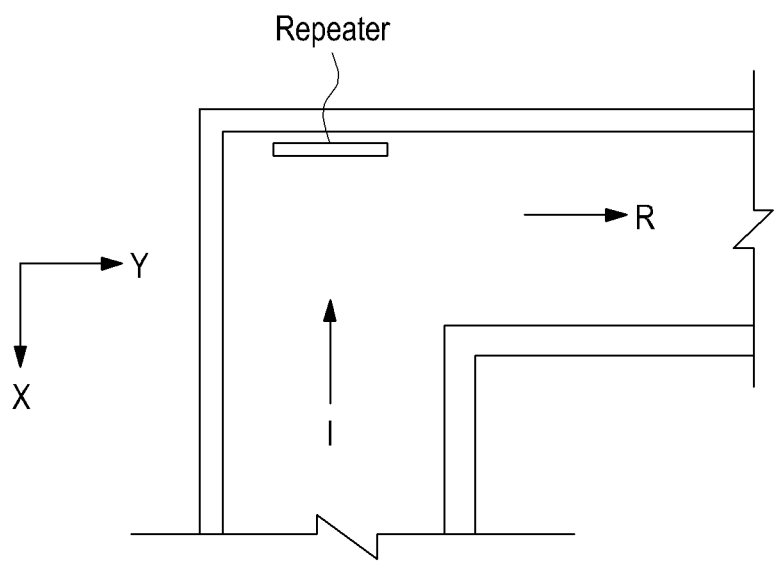
FIG. 24 is a view illustrating an environment for measuring a radiation characteristic of a non-feeding repeater.

FIG. 24 is a view illustrating an environment for measuring a radiation characteristic of a non-feeding repeater.

When the electromagnetic waves I entering into a non-feeding repeater in the indoor environment of the structure illustrated in FIG. 24 (perpendicularly intersecting hallways) enters at an angle of 90 degrees (e.g., in the X-direction), the gain of the electromagnetic waves delivered to the shadow region (re-radiated electromagnetic waves R) are listed in Table 1 below.

TABLE 1

| | Non-feeding Repeater | | | | |
|---|---|---|---|---|---|
| | Not installed | Reflector | Dual antenna system | Disclosure (Unit cells of a 8 * 8 arrangement) | Disclosure (Unit cells of a 16 * 8 arrangement) |
| Gain of Re-radiating electromagnetic wave | −92.4 dBm | −79.8 dBm | −72.3 dBm | −64.8 dBm | −61.8 dBm |
| Improvement compared to "not installed" | — | 12.6 dB | 20.1 dB | 27.6 dB | 30.6 dB |
| Improvement compared to reflector | −12.6 dB | — | 7.5 dB | 15 dB | 18 dB |
| Improvement compared to dual antenna system | −20.1 dB | −7.5 dB | — | 7.5 dB | 10.5 dB |

As listed in Table 1, it can be seen that the non-feeding re-radiating repeater 100 according to various embodiments of the present disclosure is capable of improving the gain of the electromagnetic waves delivered to the shadow region as compared to the reflector or the dual antenna system.

Of course, in installing a repeater including the non-feeding re-radiating repeater according to various embodiments of the present disclosure, the improved level of the gain of electromagnetic waves delivered to a shadow region may vary depending on the angles thereof and depending on whether power is fed. As described above, simple reflector structures may considerably contribute to the elimination of shadow regions. However, since the reflector structures are large in size, there is a difficulty in securing a space in which the reflector structures may be installed. In addition, while the gain of re-radiated electromagnetic waves may be further improved by providing an additional power-feeding structure to the dual antenna system, it is required to additionally install a power-feeding facility, for example.

Whereas, according to various embodiments of the present disclosure, in the case where the non-feeding re-radiating repeater is formed by unit cells of a 8*8 arrangement, it is possible to manufacture the non-feeding re-radiating repeater in the size of 84 mm*84 mm (in the case where the non-feeding re-radiating repeater is formed by unit cells of a 16*8 arrangement, in the size of 168 mm*84 mm). Thus, it may be easy to secure an installation space indoors or outdoors. For example, according to various embodiments of the present disclosure, the non-feeding re-radiating repeater is installable on an outside wall or an inside wall of a building. In addition, since the non-feeding re-radiating repeater is small in size it has little effect on the beauty of the building or the indoor thereof. Further, even if no power is separately fed, the gain of re-radiated electromagnetic waves can be considerably improved. Thus, it may be simple and convenient to install the non-feeding re-radiating repeater.

Figure 25:
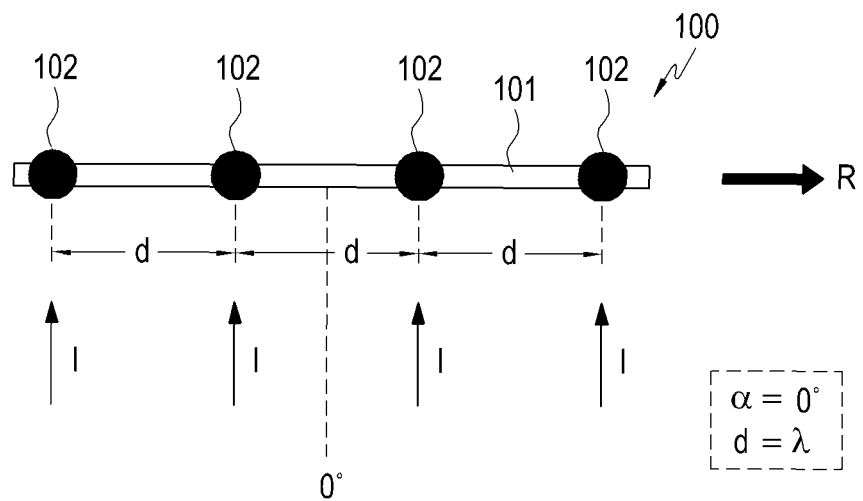
FIGS. 25 and 26 are views for describing different methods for manufacturing a non-feeding re-radiating repeater according to the various embodiments of the present disclosure.
Figure 26:
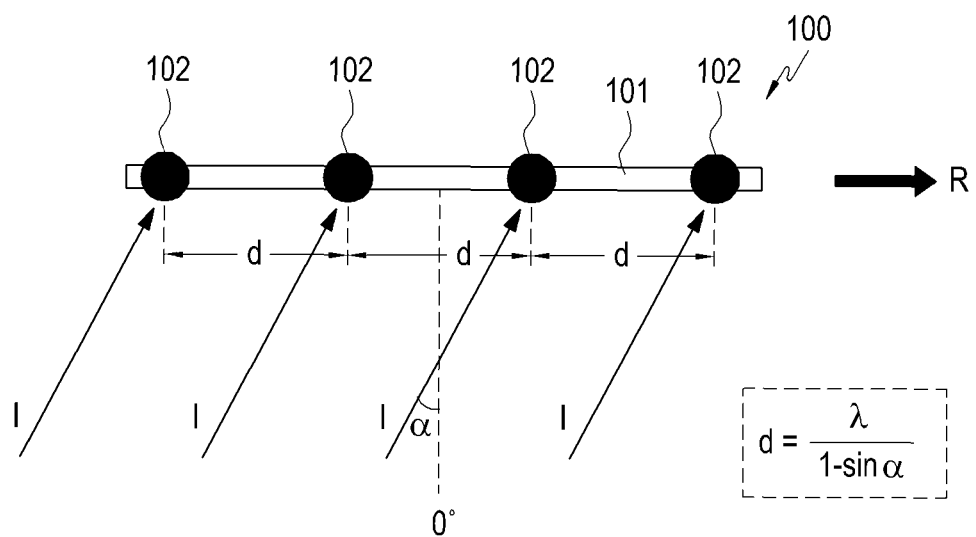
Figure 27:
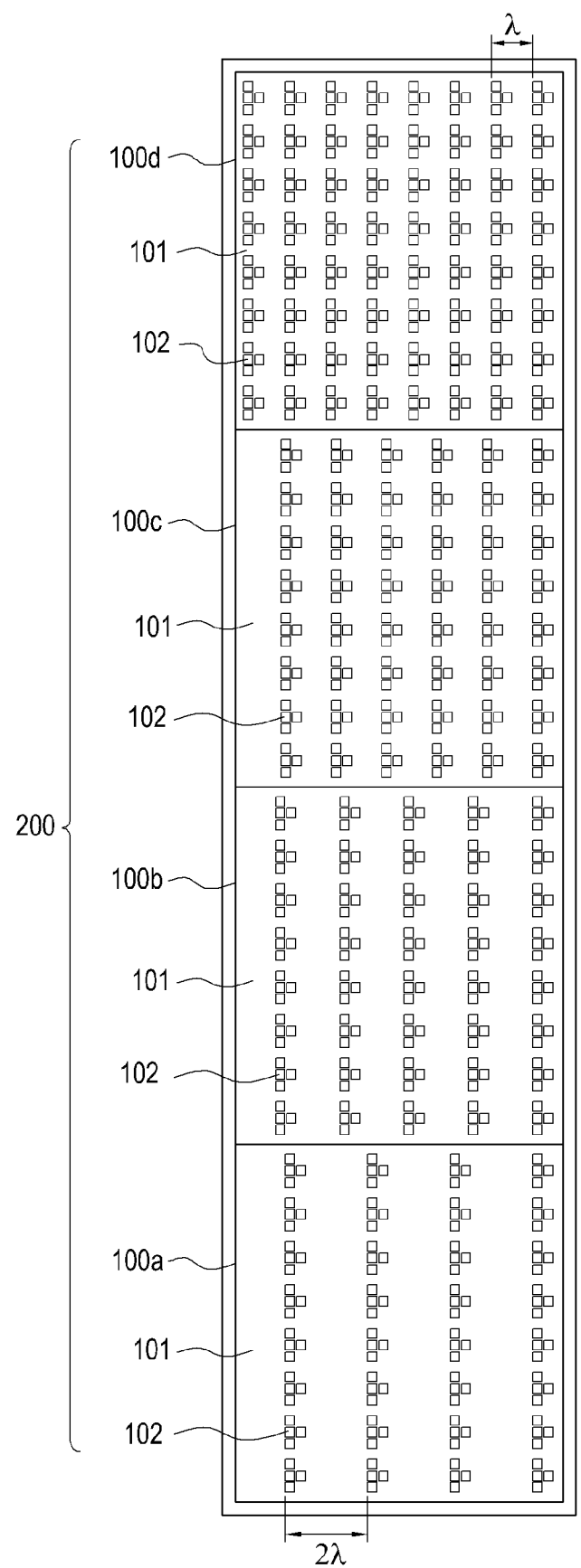
FIG. 27 is a view for describing a configuration of a non-feeding re-radiating repeater according to still another one of the various embodiments of the present disclosure.
Figure 28:
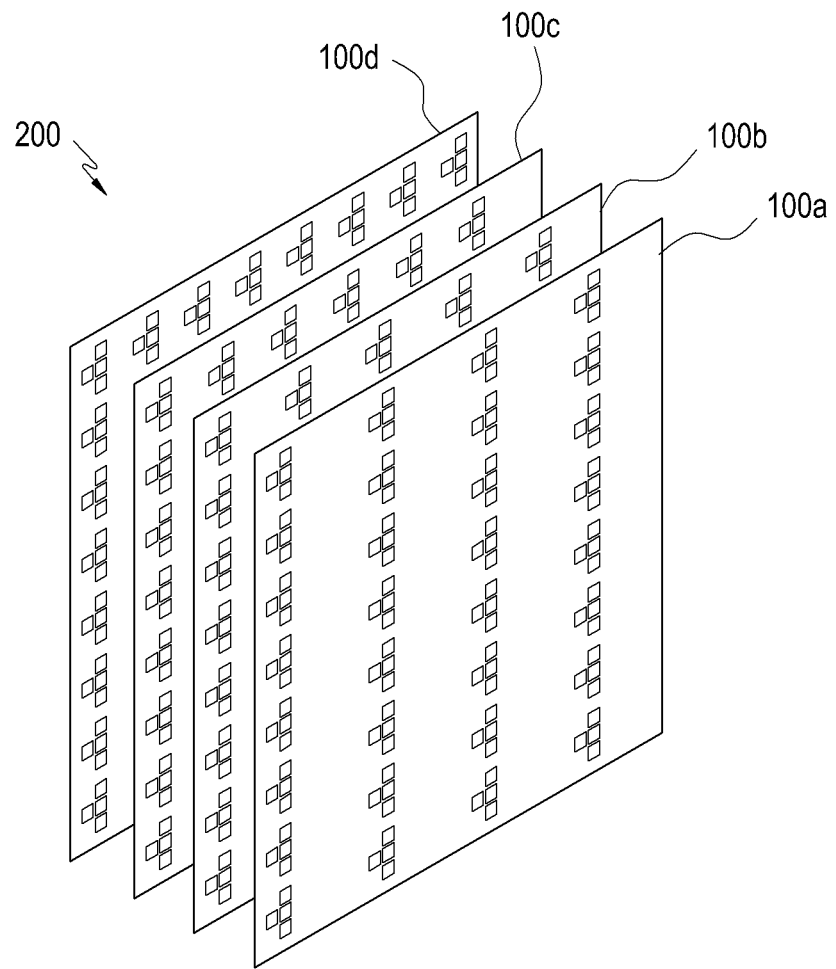
FIG. 28 is an exploded perspective illustrating a configuration of a non-feeding re-radiating repeater according to yet another one of the various embodiments of the present disclosure.

FIGS. 25 and 26 are views for describing different methods for manufacturing a non-feeding re-radiating repeater according to the various embodiments of the present disclosure. FIG. 27 is a view for describing a configuration of a non-feeding re-radiating repeater according to still another one of the various embodiments of the present disclosure. FIG. 28 is an exploded perspective illustrating a configuration of a non-feeding re-radiating repeater according to yet another one of the various embodiments of the present disclosure.

Referring to FIGS. 25 to 28, when the direction R to re-radiate incident electromagnetic waves I is set, electromagnetic waves I, which enter at different angles, may be re-radiated in the set direction by configuring a non-feeding re-radiating repeater 200 such that re-radiating repeaters 100, 100a, 100b, 100c, and 100d, each of which is formed by a dielectric substrate 101 including unit cells 102 arranged thereon, are laminated, and the interval of the unit cells 102 on at least one dielectric substrate is different from that of the unit cells 102 on any other dielectric substrate. For example, assuming that the incident angle of electromagnetic wave entering into a dielectric substrate perpendicularly is zero (0) degrees, the re-radiating direction R may be set to a 90 degree direction (e.g., a direction parallel with the dielectric substrate) when the interval d between the unit cells is set to satisfy the following Equation 4 with respect to the incident angle α.

$$d = \frac{\lambda}{1 - \sin\alpha}, \quad (4)$$

where λ is a resonant frequency wavelength of the electromagnetic wave to be re-radiated.

According to Equation 4, as illustrated in FIG. 25, the electromagnetic waves I, of which the incident angel is zero (0) degrees, may be re-radiated in the angular direction of 90 degrees by the re-radiating repeater 100, in which the unit cells 102 are arranged at an interval that is the same as the resonant frequency wavelength λ. In the case where the incident angle of the electromagnetic waves is 30 degrees, the electromagnetic waves may be re-radiated in the angular direction of 90 degrees with respect to the dielectric substrate (e.g., in the direction parallel with the dielectric substrate) by the re-radiating repeater, in which the unit cells are arranged at an interval that corresponds to twice the resonant frequency wavelength (2λ). For example, when the incident angle and re-radiating direction of the electromagnetic waves I incident on the re-radiating repeater 100 are set, it is possible to design a re-radiating repeater corresponding thereto. For example, when a resonant frequency wavelength of electromagnetic waves to be re-radiated and an installation environment of the re-radiating repeater (e.g., the incident direction and re-radiating direction R) are set, it is possible to design and manufacture a re-radiating repeater suitable therefor by adjusting the interval of the unit cells. In this way, a plurality of re-radiating repeaters may be laminated such that an arrangement interval of the unit cells included in at least one re-radiating repeater is different from that of the unit cells included in any other re-radiating repeater. When the re-radiating repeaters, in which the arrangement intervals of the unit cells are different from each other, are laminated, the electromagnetic waves incident there from different directions can be re-radiated in the same direction.

According to various embodiments, an already manufactured re-radiating repeater may receive electromagnetic waves of a designed resonant frequency incident at a predetermined incident angle and then re-radiate the electromagnetic waves to a predetermined direction while the already manufactured re-radiating repeater may transmit the electromagnetic waves incident from a different direction. Accordingly, as illustrated in FIGS. 27 and 28, another non-feeding re-radiating repeater 200 may be configured by laminating a plurality of dielectric substrates (e.g., the re-radiating repeaters 100a, 100b, 100c, and 100d), on which an arrangement interval of the unit cells on one dielectric substrate is different from the arrangement intervals of the unit cells on the other dielectric substrates. The re-radiating repeaters 100a, 100b, 100c, and 100d may receive electromagnetic waves of the same resonant frequency, which are incident from different directions, and re-radiate the electromagnetic waves in the same direction (e.g., in the angular direction of 90 degrees with respect to the dielectric substrates). For example, among the above-described re-radiating repeaters, the first re-radiating repeater 100a may re-radiate, in the direction of 90 degrees, the electromagnetic waves incident at the angle of 30 degrees, the second re-radiating repeater 100b may re-radiate, in the direction of 90 degrees, the electromagnetic waves incident at the angle of 20 degrees, the third re-radiating repeater 100c may re-radiate, in the direction of 90 degrees, the electromagnetic waves incident at the angle of 10 degrees, and the fourth re-radiating repeater 100d may re-radiate, in the direction of 90 degrees, the electromagnetic waves incident at the angle of zero (0) degrees. The non-feeding re-radiating repeater 200 configured by laminating the plurality of re-radiating repeaters 100a, 100b, 100c, and 100d may be usefully utilized for repeating the electromagnetic waves from, for example, a space (e.g., an outdoor space), of which the electromagnetic wave environment is good, to a space (e.g., an indoor space), of which the electromagnetic wave environment is poor.

In the foregoing, specific embodiments of the present disclosure have been described in detail. However, it will be evident to a person ordinarily skilled in the art that various changes and modifications can be made without departing from the scope of the present disclosure.

For example, while a specific embodiment of the present disclosure has exemplified a configuration that re-radiates, in the same direction, electromagnetic waves incident from different directions by laminating a plurality of re-radiating repeaters are laminated, other embodiments may configure a non-feeding re-radiating repeater so as to re-radiate, in different directions, electromagnetic waves incident from the same direction by laminating a plurality of re-radiating repeaters.

What is claimed is:

1. A non-feeding re-radiating repeater comprising:
   a dielectric substrate having a flat plate shape or a curved shape; and
   one or more unit cells formed on the dielectric substrate, each of the unit cells including an arrangement of a plurality of conductor patterns; and
   wherein, when electromagnetic waves are incident from a first direction, the unit cells re-radiate the electromagnetic waves in a second direction which is different from the first direction, and
   wherein the dielectric substrate re-radiates electromagnetic waves thereon in an angular direction of 90 degrees, and the interval of the unit cells on each of the dielectric substrates is set by the following equation:

$$d = \frac{\lambda}{1 - \sin\alpha},$$

where d is an interval of the unit cells arranged on each dielectric substrate, λ is a resonant frequency wavelength of the electromagnetic wave to be re-radiated, and α is an incident angle of the electromagnetic waves when the incident angle of the electromagnetic waves perpendicularly incident on the dielectric substrate is zero (0) degrees.

2. The non-feeding re-radiating repeater of claim 1, wherein a delivery width, a direction, and a directivity of re-radiated electromagnetic waves are set depending on the size, the interval, and the positions of the conductor patterns.

3. The non-feeding re-radiating repeater of claim 1, wherein the non-feeding re-radiating repeater includes a plurality of arrangements of the unit cells, and
the delivery width and direction of the re-radiated electromagnetic waves are set depending on an interval between the unit cells and the positions of the unit cells.

4. The non-feeding re-radiating repeater of claim 1, wherein the dielectric substrate is formed of a transparent material.

5. The non-feeding re-radiating repeater of claim 1, wherein the dielectric substrate is formed of a flexible material.

6. The non-feeding re-radiating repeater of claim 1, wherein the unit cells re-radiate the electromagnetic waves incident on a first surface of the dielectric substrate, to a second surface of the dielectric substrate which is opposite to the first surface of the dielectric substrate.

7. The non-feeding re-radiating repeater of claim 1, wherein the dielectric substrate is attached to any one of a window, an outer wall of a building, and an indoor wall surface.

8. The non-feeding re-radiating repeater of claim 1, wherein the repeater includes a plurality of dielectric substrates, and
an interval of the unit cells arranged on a first dielectric substrate among the plurality of dielectric substrates is set to be different from intervals of the unit cells arranged on one or more other dielectric substrates.

9. The non-feeding re-radiating repeater of claim 8, wherein the incident angle of the electromagnetic waves incident on each dielectric substrate is set to be different from the incident angle of the electromagnetic waves incident on any other dielectric substrate.

10. The non-feeding re-radiating repeater of claim 8, wherein the dielectric substrates are laminated to each other.

11. A method of manufacturing a non-feeding re-radiating repeater, the method comprising:
setting the number and arrangement structure of unit cells to be arranged on a dielectric substrate, and a re-radiating angle to re-radiate incident electromagnetic waves;
calculating a phase difference between respective unit cells from an interval of the unit cells and the re-radiating angle of each unit cell;
configuring the unit cells to be suitable for the re-radiating angle using a plurality of conductor patterns; and
determining a size of the unit cells from the calculated phase difference between the respective unit cells, and
wherein the dielectric substrates re-radiates electromagnetic waves thereon in an angular direction of 90 degrees, and the interval of the unit cells on each of the dielectric substrates is set by the following equation:

$$d = \frac{\lambda}{1 - \sin\alpha},$$

where d is an interval of the unit cells arranged on each dielectric substrate, λ is a resonant frequency wavelength of the electromagnetic wave to be re-radiated, and α is an incident angle of the electromagnetic waves when the incident angle of the electromagnetic waves perpendicularly incident on the dielectric substrate is zero (0) degrees.

12. The method of claim 11, wherein the phase difference between the respective unit cells is calculated from the following equation:

$$\psi = \beta \times d \times \cos\theta,$$

wherein ψ is a phase difference, β is a phase constant, d is a distance between centers of adjacent unit cells, and θ is the re-radiating angle.

13. The method of claim 11, wherein a correlation between the phase difference between the respective unit cells and the size of the unit cells is set in advance through a simulation.

14. The method of claim 11, wherein the dielectric substrate is formed of a transparent material.

15. The method of claim 11, wherein the dielectric substrate is formed of a flexible material.

* * * * *